United States Patent
Onodera et al.

(10) Patent No.: US 7,701,855 B2
(45) Date of Patent: Apr. 20, 2010

(54) COMMUNICATION DEVICE, COMMUNICATION SYSTEM, COMMUNICATION METHOD, COMMUNICATION PROGRAM AND RECORDING MEDIUM STORING THE COMMUNICATION PROGRAM

(75) Inventors: Wataru Onodera, Tokorozawa (JP); Makoto Matsumaru, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 1595 days.

(21) Appl. No.: 10/857,438

(22) Filed: Jun. 1, 2004

(65) Prior Publication Data

US 2005/0002340 A1 Jan. 6, 2005

(30) Foreign Application Priority Data

Jun. 2, 2003 (JP) ............................. 2003-156629

(51) Int. Cl.
 G08C 15/00 (2006.01)
 H04L 12/56 (2006.01)
 H04L 12/66 (2006.01)
(52) U.S. Cl. ..................... 370/235; 370/419; 370/463
(58) Field of Classification Search ................. 370/253, 370/254–255, 359, 419, 463
 See application file for complete search history.

(56) References Cited

U.S. PATENT DOCUMENTS 5,504,757 A * 4/1996 Cook et al. .................. 370/468

(Continued)

FOREIGN PATENT DOCUMENTS

JP 5-199387 8/1993

(Continued)

OTHER PUBLICATIONS

Yashwante R et al: "IEEE 1394a_2000 physical layer ASIC" Design Automation Conference, 2002. Proceedings of ASP-DAC 2002. 7th Asia and South Pacific and the 15th International Conference on VLSI Design. Proceedings. Bangalore, India Jan. 7-11, 2002, Los Alamitos, CA, USA, IEEE Comput. Soc, US, Jan. 7, 2002, pp. 795-800, XP010588191 ISBN: 0-7695-1441-3 *p. 795, left-hand column, paragraph 1*.

(Continued)

*Primary Examiner*—Chi H Pham
*Assistant Examiner*—Warner Wong
(74) *Attorney, Agent, or Firm*—Kratz, Quintos & Hanson, LLP

(57) ABSTRACT

A communication device (200) has a controller (180) that has a maximum speed information requesting section adapted to transmit a maximum speed information requesting command at the minimum one of the stepwise differentiated transmission speeds, requesting transmission in return of maximum speed information for another communication device, a maximum speed information acquisition section adapted to acquire maximum speed information, a confirmation information transmitting section adapted to transmit confirmation information, switching the transmission speed within a range between the upper limit equal to the maximum transmission speed for the communication device (200) or that for the another communication device, whichever lower, and the lower limit equal to the transmission speed higher than the minimum transmission speed by a step and a transmission speed selecting section adapted to select the maximum transmission speed at which it can acquire the reception information from said another communication device as transmission speed for transmitting data to said another communication device for data communication.

10 Claims, 11 Drawing Sheets

U.S. PATENT DOCUMENTS

| | | | |
|---|---|---|---|
| 6,397,277 B1* | 5/2002 | Kato et al. | 710/104 |
| 6,477,171 B1* | 11/2002 | Wakeley et al. | 370/404 |
| 6,509,988 B1* | 1/2003 | Saito | 398/47 |
| 6,771,694 B1* | 8/2004 | Baumgartner | 375/220 |
| 6,829,225 B2* | 12/2004 | Staats | 370/255 |
| 6,904,539 B2* | 6/2005 | Ueno | 713/500 |
| 7,068,609 B2* | 6/2006 | Huff | 370/252 |
| 7,177,283 B2* | 2/2007 | Fukae et al. | 370/252 |
| 7,290,163 B2* | 10/2007 | Yanagihara | 713/600 |
| 7,340,515 B2* | 3/2008 | Walker et al. | 709/224 |
| 2001/0040709 A1 | 11/2001 | Takeuchi et al. | 39/110 |
| 2002/0085505 A1* | 7/2002 | Suda | 370/253 |
| 2005/0013252 A1* | 1/2005 | Ono et al. | 370/235 |
| 2005/0047349 A1* | 3/2005 | Brocke et al. | 370/252 |
| 2005/0117511 A1* | 6/2005 | Tsujimoto | 370/229 |
| 2006/0215555 A1* | 9/2006 | Futenma et al. | 370/230 |

FOREIGN PATENT DOCUMENTS

| | | |
|---|---|---|
| JP | 2003-174486 | 6/2003 |
| WO | WO 00/67385 | 11/2000 |

OTHER PUBLICATIONS

European Search Report dated Dec. 28, 2005.
Office Action issued for the corresponding Japanese patent application No. 2003-156629 on Nov. 25, 2008.

* cited by examiner

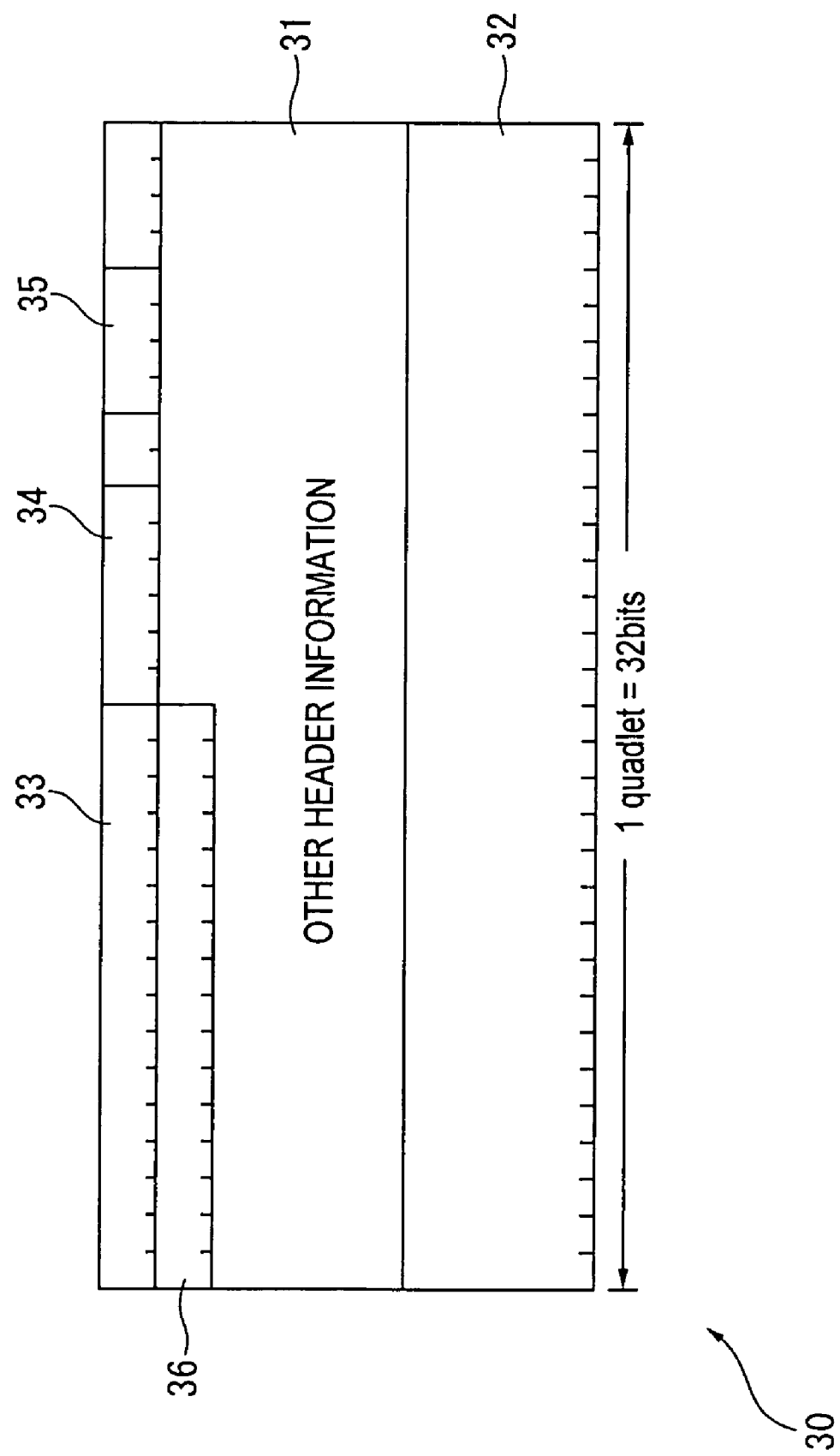

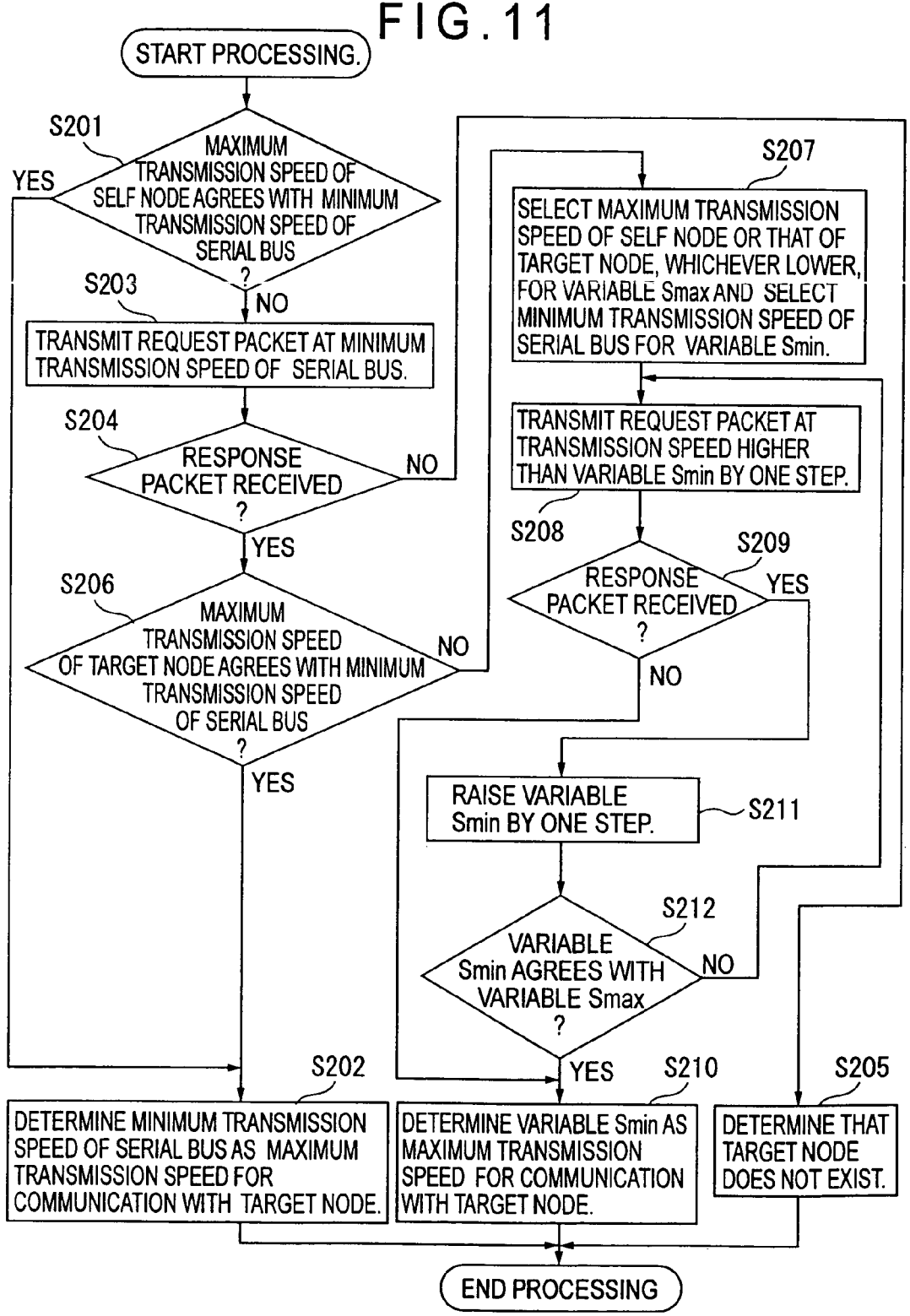

COMMUNICATION DEVICE, COMMUNICATION SYSTEM, COMMUNICATION METHOD, COMMUNICATION PROGRAM AND RECORDING MEDIUM STORING THE COMMUNICATION PROGRAM

BACKGROUND OF THE INVENTION

1. Field of the Invention

The present invention relates to the technical field of transmission speed for sending/receiving data by way of a network. More particularly, it relates to the technical field of selecting a transmission speed for a serial transmission system conforming to the IEEE1394 Standard.

2. Description of Related Art

The significance of technologies conforming to IEEE1394 Standard (formal nomenclature, "IEEE Std. 1394-1995 IEEE Standard for a High Performance Serial Bus) has remarkably increased in recent years because of the effectiveness for transferring digital data on the background of the rapid expansion of digital contents and the trend of digitization package mediums.

Generally, IEEE1394 Standard is suited for transferring AV digital data including audio data and video data.

According to IEEE1394 Standard, a plurality of communication devices (to be referred to simply as nodes hereinafter) are connected to each other by way of a serial bus that operates as network and data for a plurality of channels between nodes (the standard provides that maximally sixty three different channels can be used for data transmission within a system using a single serial bus for interconnection) are transmitted on a time division basis. Additionally, the standard provides high-speed serial transmission of data at a transmission speed of 100 Mbps (bits per second (to be referred to as S100 hereinafter)), 200 Mbps (to be referred to as S200 hereinafter) or 400 Mbps (to be referred to as S400 hereinafter).

IEEE1394 Standard also provides that, when a new node is connected to a group of nodes that are already interconnected by a serial bus (at the time of bus connection) or when a node is removed from a group of nodes that are interconnected by a serial bus (at the time of bus release), initialization of the serial bus (so-called bus reset) is carried out. Once the bus is reset, predetermined processing operations are performed as described in greater detail hereinafter and a new connection mode (to be referred to as topology hereinafter) is defined for the serial bus to improve the degree of freedom of connection and hence that of convenience on the part of system users.

IEEE1394 Standard also defines two data transmission modes including an asynchronous transfer mode and an isochronous transfer mode.

The asynchronous transfer mode guarantees that packets are reliably transmitted to the target node. In an asynchronous transfer mode, the sender node transmits packets containing header information and actual data to the target node. As the target node receives the packets, it typically transmits an acknowledge packet that contains a message that the target node recognizes reception of the packets (reception information) back to the sender node. Thus, the sender node that has transmitted the packets confirms that the target node has received the transmitted packets when it receives the acknowledge packet.

In the isochronous transfer mode, a data communication takes place in synchronism with transmission of a cycle start packet by a sole cycle master node that exists on the bus and the transmission is repeated at regular intervals (125 μsec). In the isochronous transfer mode, instead of transmitting packets to a particular target node, packets (the below-described isochronous packets) are transmitted to the entire bus by way of one of a plurality of channels. Unlike in the asynchronous transfer mode, the target node does not transmit an acknowledge packet to the sender node when it receives the packets transmitted from the sender node.

Conventionally, according to IEEE1394 Standard, the maximum transmission speed for transmitting packets in an asynchronous transfer mode (to be referred to as asynchronous packets hereinafter) or in an isochronous transfer mode (to be referred to as isochronous packets hereinafter) between a node trying to transfer data (to be referred to as self node hereinafter) and a node that receives the data (to be referred to as target node hereinafter) needs to be determined by following the procedure of (1) recognizing the topologies of each and every node of the transmission path (to be referred to as each and every path node hereinafter) and acquiring the transmission speed corresponding to the physical layer (physical layer chip) of each and every path node (to be referred to as PHY SPEED hereinafter), (2) acquiring the transmission speed corresponding to the link layer (link layer chip) of the target node (to be referred to as LINK SPEED hereinafter) and (3) performing a topological analysis.

(1) Acquisition of PHY SPEED at the Physical Layer of Each and Every Path Node

The self identifying information (to be referred to as self-ID packet hereinafter) transmitted from each and every path node after a bus reset is acquired for the purpose of acquiring the PHY SPEED of the physical layer of each and every path node.

Self-ID packets in each node are transmitted in the following manner.

When a bus reset takes place, firstly a processing operation for recognizing all the topologies of the connected nodes (tree identification) is performed. In this operation, a single node is eventually selected as root node by determining the orientation of each and every connected port toward a root node.

Then, a processing operation for self identification of each node is performed. In this operation, each node acquires information for self identification (physical layer ID) that is unique on the bus and necessary for identification and transmits a self-ID packet that is necessary for bus management and contains the physical layer ID and information on the transmission speed corresponding to the self node.

Each and every path node acquires the self-ID packets transmitted from the other nodes. In this way, it is possible to acquire information on the transmission speed of each and every path node.

FIG. 1 is a schematic illustration of the configuration of a self-ID packet 10 that each and every path node transmits. The self-ID packet 10 has a phy ID field 11 describing information necessary for identifying the physical layer of the self node, a sp field 12 describing information on the transmission speed of the physical layer, a p0 field 13, a p1 field 14, and a p2 field 15 (the p0 field 13, the p1 field 14 and the p2 field 15 describing information on the connection status of the self node), and a data area 16.

All the other nodes acquire the transmission speed by reading the sp field 12. The sp field 12 currently contains a 2-bit data. For example, "00", "01" and "11" may respectively indicate S100, S200 and S400. The self-ID packet 10 contains other data as well.

(2) Acquisition of LINK SPEED at the Link Layer of the Target Node

Information on various communication requests for data communication (in IEEE1394 Standard, a communication request is defined as transaction, and transmission of communication requests is defined as issuance of a transaction) is transmitted in an asynchronous transfer mode and the transmission speed of the link layer written in the configuration ROM that stores information specific to the device is acquired for the purpose of acquiring the LINK SPEED of the link layer of the target node.

More specifically, the self node issues a transaction and reads 4-Byte data (1 Quadlet) from a bus information block 20 in the configuration ROM of the target node shown in FIG. 2. Then, the self node acquires a link spd field 21, which describes the transmission speed, of the bus information block 20 so as to acquire the transmission speed of the target node.

Note that link spd field 21 also contains a 2-bit data and describes, for example, "00", "01" and "11", which may respectively indicate S100, S200 and S400, as in the case of the sp field 12 of the physical layer. The bus information block 20 also contains a cyc clk acc field 22 that indicates the clock accuracy at the time of synchronous communication, a node vendor ID field 23 that indicates the unique ID of the device, a chip ID field 24 and a data area 25 for other data.

(3) Topological Analysis

In the topological analysis, the maximum transmission speed at which data can be transmitted is determined on the basis of the transmission speed of each and every path node and the transmission speed at which the connected target node can receive signals that are acquired in a manner as described above. In other words, in the topological analysis, it is determined whether other nodes are connected between the self node and the target node or not and the transmission speed is determined on the basis of the topologies of the other nodes.

To determine if other nodes are connected between the self node and the target node, the topology of each of the other nodes is analyzed by referring to the p0 field 13, the p1 field 14 and the p2 field 15 of the self-ID packet 10, which are described above by referring to FIG. 2. For example, the topology of the node is analyzed by finding out if it is "a node connected to the root side", "a node connected to the side opposite to the root side" or "an unconnected node". When other nodes are connected between the self node and the target node, the path down to the target node will be recognized and node information on the other node located on the path will be acquired.

Now, as an example, a conventional process of defining the transmission speed between nodes according to IEEE1394 Standard will be described below.

For example, as shown in FIG. 3, when a device B exists between a device A trying to transfer data and a device C to which the data will be transferred, and both the PHY SPEED of the physical layer and the LINK SPEED of the link layer of the device A are S400, while the PHY SPEED of the physical layer and the LINK SPEED of the link layer of the device B are respectively S200 and S100 and both the PHY SPEED of the physical layer and the LINK SPEED of the link layer of the device C are S400, then the maximum inter-node transmission speed between the device A and the device B via the link layers thereof is S100 and the maximum inter-node transmission speed between the device A and the device C via the physical layers thereof is S200.

However, with the above described known method of determining the transmission speed according to the IEEE1394 Standard, it is necessary to carry out the operations by the steps of (1) acquire the PHY SPEED of the physical layer of each and every path node, (2) acquire the LINK SPEED of the link layer of the target node (and also that of each and every node on the transfer path) and (3) perform an topological analysis as pointed out above. Then, there arise problems including one that these operations are time consuming.

Another problem that arises is that the topological analysis may be a complex one particularly when a large number of nodes exist on the transfer path and the number of operations needed to be carried out before determining the transmission speed may increase. Then, the efficiency of the processing operations will be worsened.

Additionally, IEEE1394 Standard specifically includes IEEE1394-1995 Standard and IEEE1394a-2000 Standard. The bus information block 20 of a communication device that does not conform to IEEE1394a-2000 does not have a link spd field 21 that describes the transmission speed. Then, the transmission speed of the link layer is not known and there arise problems including one that the transmission speed cannot be determined appropriately.

SUMMARY OF THE INVENTION

In view of the above identified circumstances, the present invention has its principal object to provide a device, a system, a method and a program for communication that can appropriately determine the transmission speed between communication devices and improve the efficiency of the processing operations necessary for determining the transmission speed as well as a recording medium storing such a program.

A communication device according to an aspect of the present invention is adapted to select one of a plurality of stepwise differentiated transmission speeds as the transmission speed to be used for data communication between itself and another communication device, the device includes: a maximum speed information requesting section adapted to transmit a maximum speed information requesting command to the another communication device at the minimum one of the transmission speeds, requesting transmission in return of maximum speed information for target node, which is the maximum data communication speed information of said another communication device; a maximum speed information acquisition section adapted to acquire maximum speed information for target node from said another communication device; a confirmation information transmitting section adapted to transmit confirmation information for confirming the capability of transmission for data communication with said another communication device, switching the transmission speed for transmitting the confirmation information within a range between the upper limit equal to speed of the maximum speed information of the self node, which is the maximum speed for the communication device to transmit data to another communication device, or that of the target node, whichever lower, and the lower limit equal to the transmission speed higher than the minimum transmission speed by a step; and a transmission speed selecting section adapted to detect the reception information transmitted back from said another communication device in response to the reception of the confirmation information and select the maximum transmission speed of the detected reception information as transmission speed for transmitting data to said another communication device for data communication.

A communication system according to another aspect of the present invention includes: a communication device as defined above; and at least one of the another communication device connected to the communication device via a telecommunication line so as to be capable of data communication, said another communication device being adapted to transmit back the maximum speed information of the target node in response to the reception of the maximum speed information requesting command and also transmit back the reception information in response to the reception of the confirmation information.

A communication method according to still another aspect of the present invention is adapted to select one of a plurality of stepwise differentiated transmission speeds as the transmission speed to be used for data communication between a communication device and another communication device, the method including: transmitting a maximum speed information requesting command at the minimum one of the transmission speeds, requesting transmission in return of maximum speed information of target node, which is the maximum data communication speed information of said another communication device; acquiring maximum speed information of target node from said another communication device; transmitting confirmation information for confirming the readiness for data communication with said another communication device, switching the transmission speed for transmitting the confirmation information within a range between the upper limit equal to speed of the maximum speed of the self node, which is the maximum speed for the communication device to transmit data to another communication device, or that of the target node, whichever lower, and the lower limit equal to the transmission speed higher than the minimum transmission speed by a step; and detecting the reception information transmitted back from said another communication device in response to the reception of the confirmation information and selecting the maximum transmission speed of the detected reception information as transmission speed for transmitting data to said another communication device for data communication.

A computer program according to still another aspect of the present invention is adapted to make the above communication method of the present invention to be executed by a computing section.

A recording medium according to a further aspect of the present invention stores the communication program so as to be read by a computing section.

BRIEF DESCRIPTION OF THE DRAWINGS

FIG. 5 is a schematic illustration of the configuration of a data packet conforming to the IEEE1394 Standard;

FIG. 6A is a schematic illustration of showing a processing operation of asynchronous arbitration, and FIG. 6B is a schematic illustration of an acknowledge packet in asynchronous arbitration;

FIG. 11 is a flow chart showing a processing operation of determining a transmission speed of the second embodiment of the present invention.

DETAILED DESCRIPTION OF PREFERRED EMBODIMENT(S)

Figure 1:
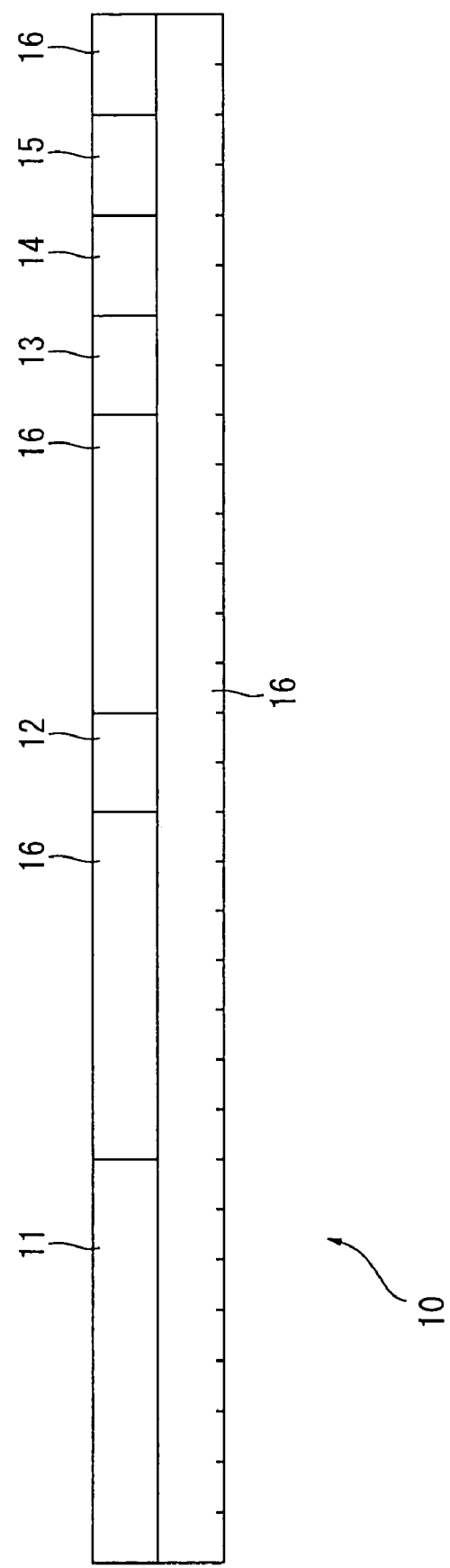
FIG. 1 is a schematic illustration of the configuration of a self-ID packet (information for self identification) conforming to IEEE1394 Standard.
Figure 2:
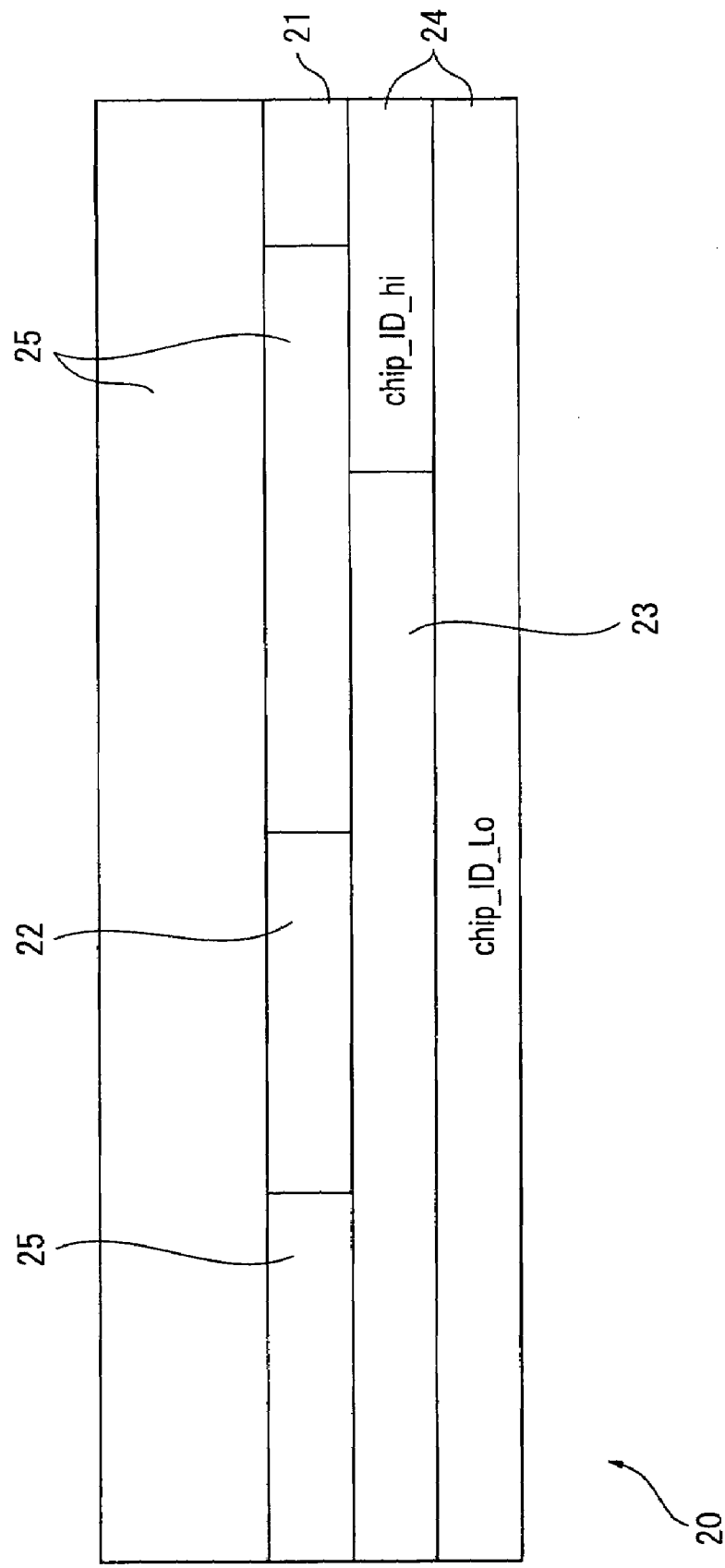
FIG. 2 is a schematic illustration of the configuration of a bus information block conforming to IEEE1394 Standard.
Figure 3:
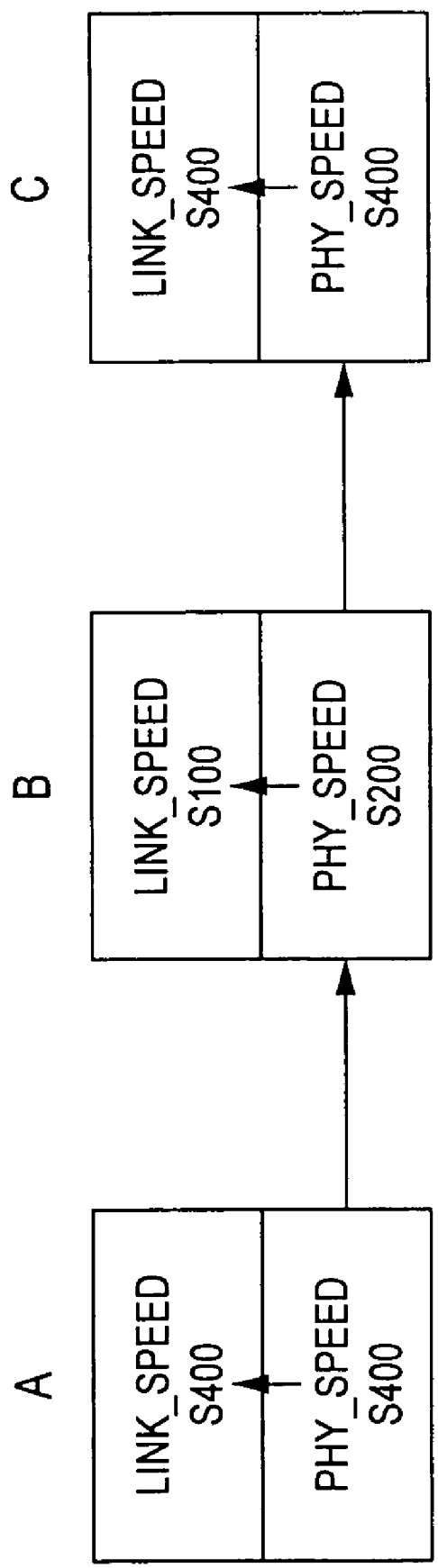
FIG. 3 is a schematic illustration showing a conventional operation of determining an inter-node transmission speed conforming to IEEE1394 Standard.

Now, preferred embodiments of the present invention will be described by referring to the accompanying drawings.

Note that the embodiments that are described hereinafter are those of communication device having an IEEE1394 bus (to be referred to as serial bus hereinafter) conforming to IEEE1394 Standard.

I. IEEE1394 Standard

Before describing specific embodiments, firstly IEEE1394 Standard to which the embodiments conform for data transmission will be briefly described below.

As pointed out above, IEEE1394 Standard provides that a plurality of communication devices, or nodes, are interconnected by way of a serial bus and data are transmitted for a plurality of channels between any of the nodes on a time division basis.

IEEE1394 Standard (to be referred to simply as the serial bus standard hereinafter) provides that, when a new node is connected to a group of nodes that are already interconnected by a serial bus (at the time of bus connection) or when a node is removed from a group of nodes that are interconnected by a serial bus (at the time of bus release), the serial bus is initialized, or reset. Once the bus is reset, a predetermined processing operation is performed as described below and a new topology is defined for the serial bus (1) A node that detects a change in the topology transmits a bus reset signal to another node connected to the serial bus, indicating that a bus reset has taken place, and the node that receives the signal transmits a bus reset signal to still another node connected. In this way, a bus reset signal is transmitted to all the nodes.

(2) After the bus reset, each of the connected nodes is identified so as to be able to be treated as one connected to a tree and one of the nodes is selected as root node as all the connected nodes are oriented to the root node (tree identification processing).

(3) Then, the selected root node defines a single piece of information (physical ID) for identifying each node on the bus and transmits a self-ID packet 10 necessary for bus management (self identification processing).

(4) Finally, each node monitors the self-ID packet 10 from some other node and specifies an IRM (isochronous resource manager) node that provides a register for allocating communication channels and bands within the period of self identification procedure.

A new topology is configured after the bus reset as a result of the above four steps of processing operation.

When data are actually transmitted after configuring the new topology, the sender node that is trying to start transmission of the data inquires of the IRM node the current communication status of each of the other nodes and, if the channel and the band it wants to use are available, the sender node acquires the right of data transmission (more specifically, the sender node securely takes the channel and the band it uses) and starts transmitting data.

Now, a communication layer that is connected to some other communication device so as to be used for the purpose of communicating with the other communication device under control and exchanging data will be described below.

Figure 4:
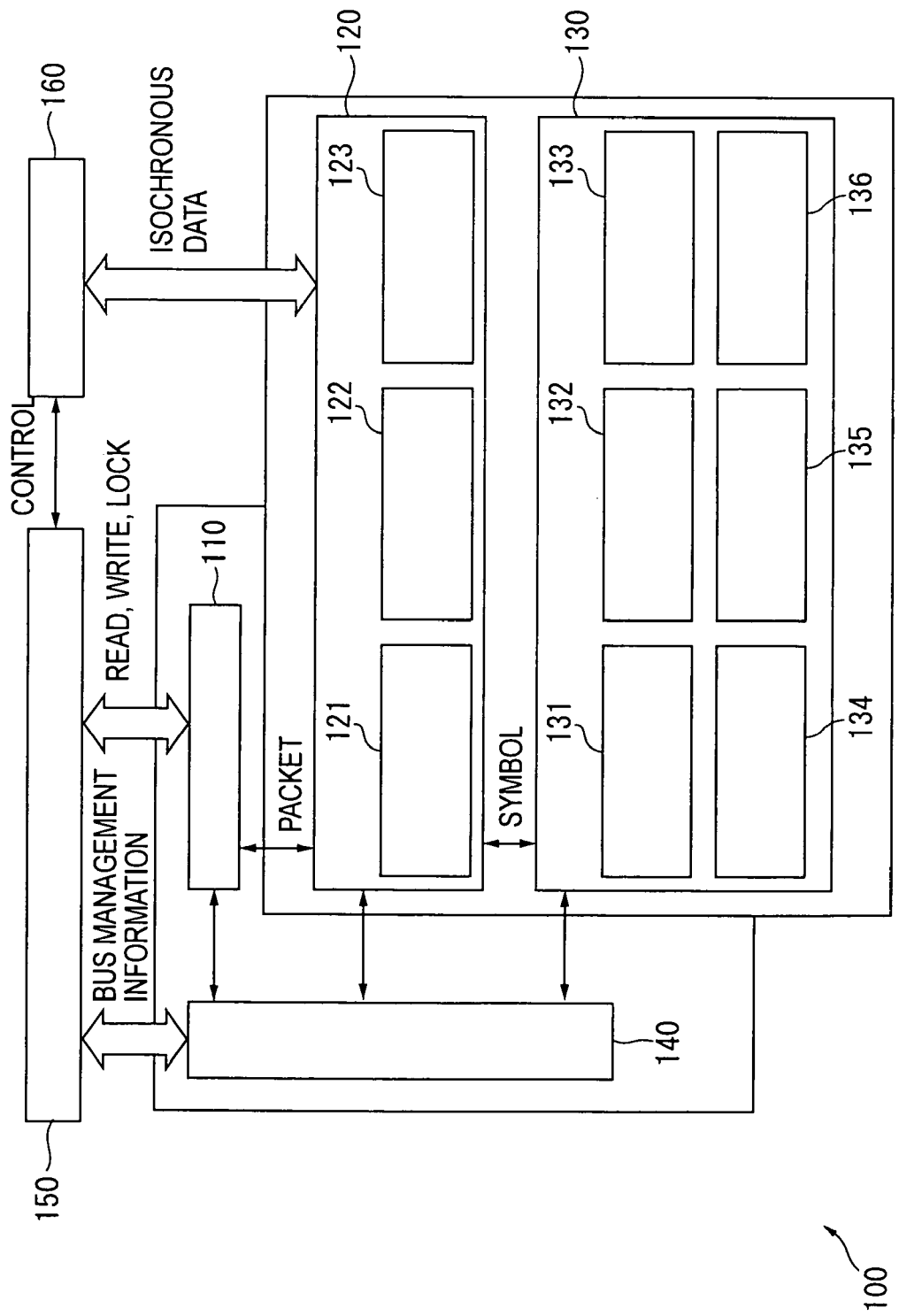
FIG. 4 is a schematic illustration of the configuration of a communication layer conforming to IEEE1394 Standard.

FIG. 4 is a schematic illustration of the configuration of the communication layer conforming to IEEE1394 Standard.

As shown in FIG. 4, an IEEE1394 communication layer 100 has a transaction layer 110, a link layer 120, a physical layer 130 and a serial bus managing section 140 that manages the serial bus. The transaction layer 110, the link layer 120 and the physical layer 130 are interconnected so as to be able to communicate with each other. Additionally, the transaction layer 110, the link layer 120 and the physical layer 130 are connected to the serial bus managing section 140 so as to be able to communicate with each other. Furthermore, the transaction layer 110 and the link layer 120 are connected to an application layer 150 that is a functional block of a higher order so as to be able to communicate with each other.

More specifically, the transaction layer 110 is adapted to perform read, write and lock processing operations (to be referred to respectively as read transaction, write transaction and lock transaction hereinafter) in order to provide an asynchronous data transmission service that is to be utilized by the application layer 150 for the purpose of data communication with some other device.

Note that, when the application layer 150 transmits isochronous data, it generates the data to be transmitted by means of a data generating section 160 in a predetermined format and transmits the generated data to each device.

The link layer 120 has a cycle controller 121 that operates for cycle control, which will be described hereinafter, a packet receiving section 122 and a packet transmitting section 123 that operate for address processing, data error confirmation and the like.

A request for an asynchronous transmission server, which will be described hereinafter, is issued from the application layer 150 to the link layer 120 without passing by the transaction layer 110. In other words, the link layer 120 directly transmits isochronous data to and receives isochronous data from the data generating section 160 that generates various data in a predetermined format for data transmission.

The physical layer 130 has an arbitration section 131 adapted to arbitration processing for the purpose of allowing only a single node to start data transmission, a re-synchronizing section 132 adapted to resynchronization of communication clock, an encoding/decoding section 133 for converting logic symbols to be used in the link layer 120 and signals to be used in the physical layer 130, a mechanical interface 134 adapted to mechanical interface processing for the connectors/cables necessary for physical connection with some other communication device, a bus initialization processing section 135 adapted to execute reconfiguration of the serial bus as a result of a bus reset and an electric interface 136 adapted to electric interface processing for determining the electric level of communication signals.

Now, an asynchronous transfer mode and an isochronous transfer mode will be briefly described below.

According to IEEE1394 Standard, data are divided into packets, which are then transmitted on a time division basis using cycles having a cycle of 125 μsec as reference, and cycles are generated by a cycle start signal supplied from a node that functions as cycle master.

In an isochronous transfer mode, data are transmitted by isochronous transmission that uses isochronous packets and secures a band necessary for transmission from the very start of each and every cycle. Isochronous transmission is characterized in that, while data are guaranteed to be transmitted in a predetermined period of time in an isochronous transfer mode, there is no scheme provided to protect the data being transmitted in an isochronous transfer mode if a transmission error occurs so that the data involved in the error will be lost.

In an asynchronous transfer mode, data are transmitted by asynchronous transmission in which the node that secures the serial bus as a result of arbitration transmits asynchronous packets in a time period of each cycle that is not used for isochronous transmission. Asynchronous transmission is characterized in that transmission timing is not constant although transmission is reliably realized by using the feature of acknowledge and retry, which will be described hereinafter.

Additionally, it is provided that the maximum temporal length of an isochronous transmission area within a single isochronous cycle is 100 μsec for isochronous transmission. Therefore, the sum of the temporal lengths occupied by the data assigned to each channel in a single isochronous transmission area needs to be not longer than 100 μsec.

Now, transactions in an asynchronous transfer mode will be described below.

As described above, in an asynchronous transfer mode, data are transmitted by using the feature of acknowledge and retry. The sender node notifies the specified node of transmission of data packets 30, which will be described hereinafter, and the receiver node notifies the sender node of reception of data packets 30 by transmitting an acknowledge packet back to the sender node.

As shown in FIG. 5, a data packet 30 that is transmitted in an asynchronous transfer mode has a header section 31, an actual data section 32, a destination ID field 33 that describes identification of the packet destination, a t1 field 34 that describes information for recognizing agreement of a pair of transactions for a request packet and a response packet, a tcode field 35 that describes information on the types of transactions, and a Source ID field 36 that describes information for identifying the packet sender.

Figure 6A:
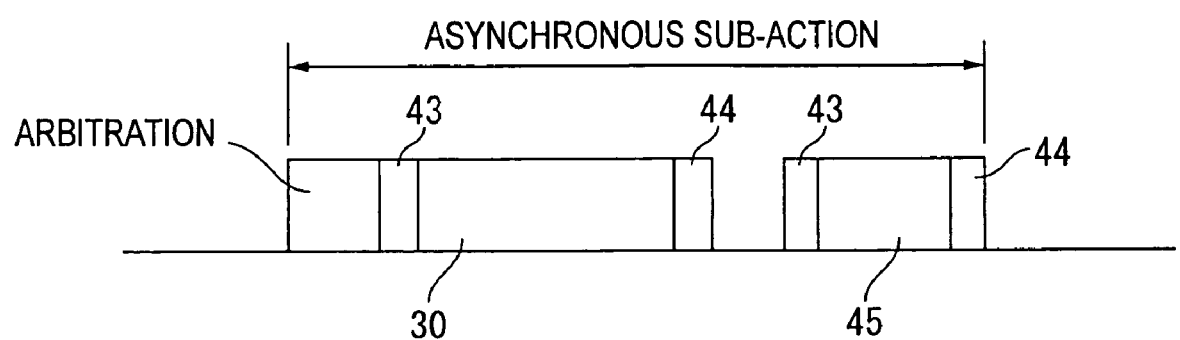
FIGS. 6A and 6B are schematic illustrations of the configuration of asynchronous arbitration conforming to IEEE1394 Standard.

In an asynchronous transfer mode, a processing operation as described below will be performed for transmitting a single data (to be referred to as asynchronous sub-action hereinafter) (see FIG. 6A).

Firstly, the node that wants to transmit data starts arbitration when it comes into a data transmission standby status. Then, the sender node that prevails in the arbitration and hence is authorized to operate for data transfer transmits a data packet 30 accompanied by a reception standby signal 43, which is a command for being in a reception ready state, and a data end information 44 to each node. Finally, upon receiving the data packet 30, each of the nodes immediately transmits an acknowledge packet 45 indicating that it is in a reception ready state and accompanied by the reception standby signal 43 and the data end information 44 to the sender node.

Figure 6B:
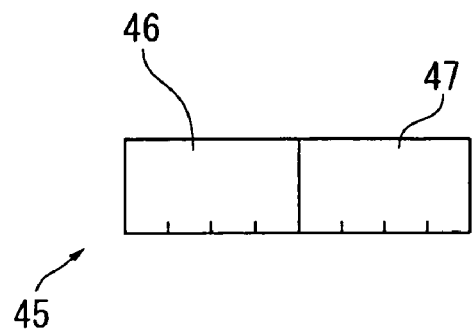

As shown in FIG. 6B, the acknowledge packet 45 has an acknowledge code 46 and acknowledge parity 47.

There are three types of transactions including read, write and lock transactions. A read transaction has a function of reading data for the data length specified by the destination address of the target node. A write transaction has a function of writing data for the data length specified by the destination address of the target node. A lock transaction has a function of carrying out a predetermined processing operation by the sender node and the receiver node according to a predetermined command. The processing operation may be a compare swap lock transaction, a mask swap lock transaction, a fetch address lock transaction or the like.

II. Embodiments

Figure 8:
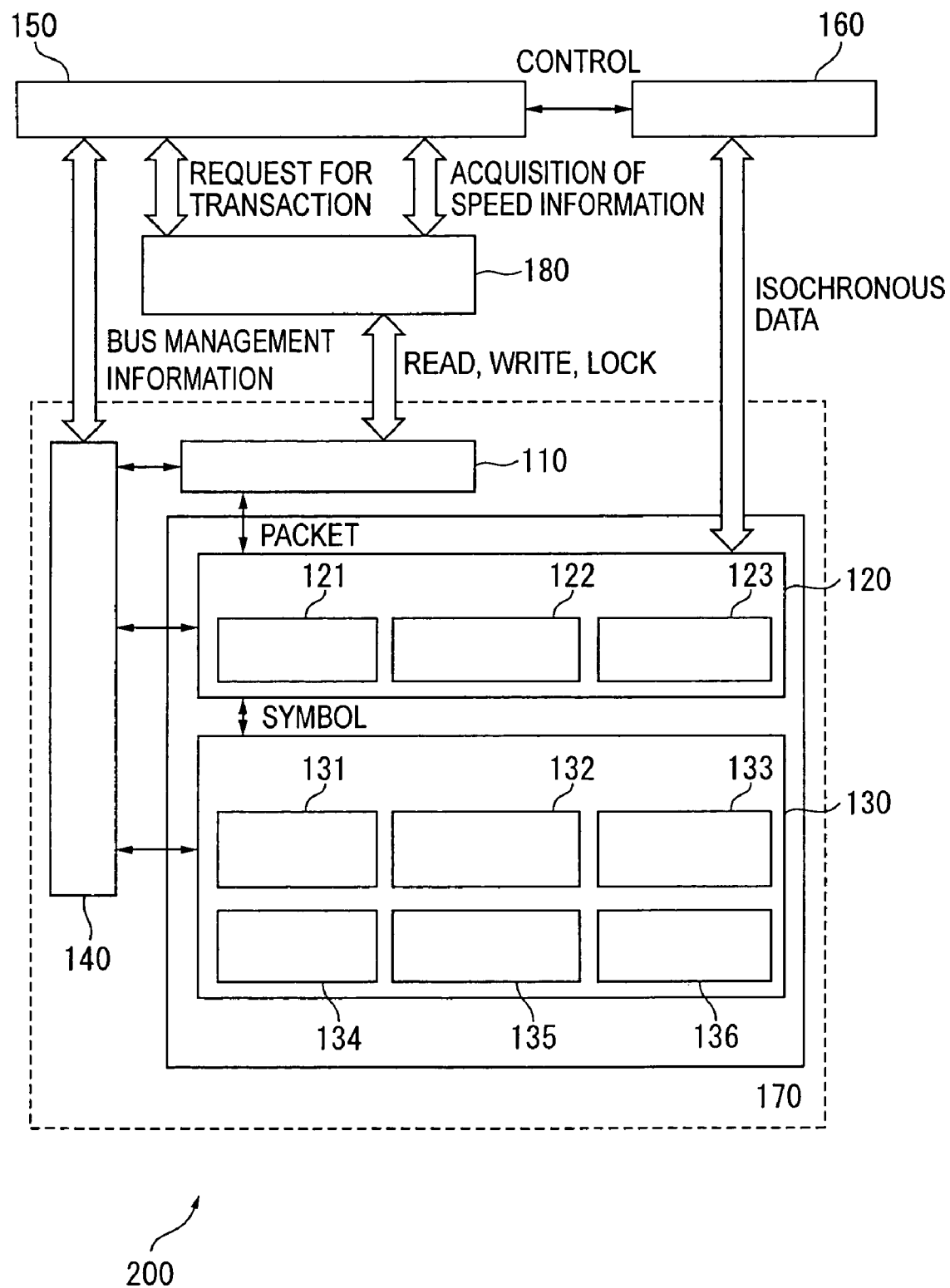
FIG. 8 is a schematic block diagram of a communication device according to the first and second embodiments.
Figure 9:
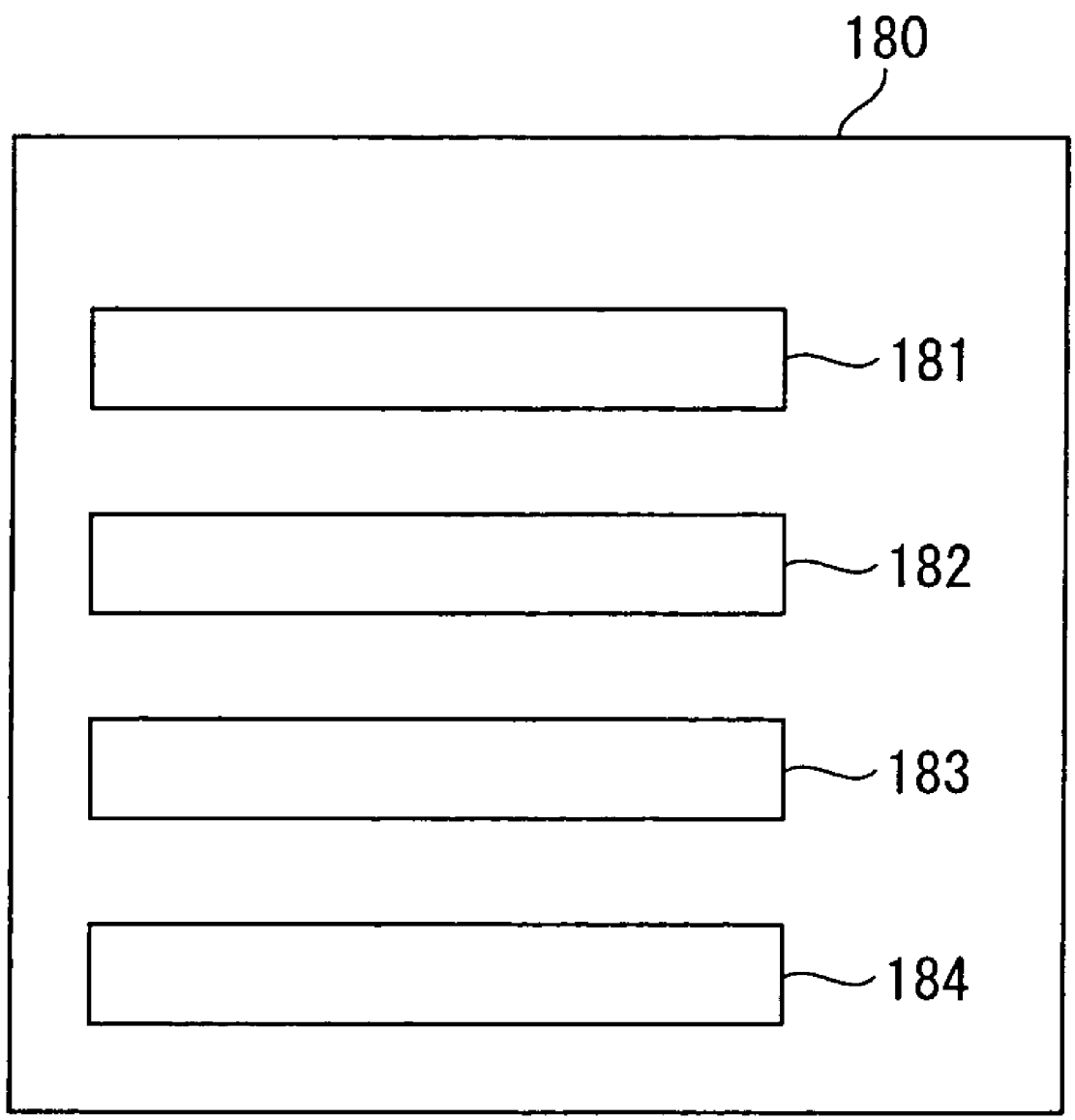
FIG. 9 is a schematic block diagram of a controller of the communication device according to the first and second embodiments.

Now, with reference to FIGS. 7 through 9, communication device adapted to determine the transaction speed at which data is transmitted by referring to IEEE1394 Standard according to the embodiment will be described below.

1st Embodiment

Firstly, a 1394ARP (Address Resolution Protocol) packet that is utilized to determine the transmission speed of the first embodiment and the configuration of communication device of the first embodiment will be described by referring to FIGS. 7 through 9.

Figure 7:
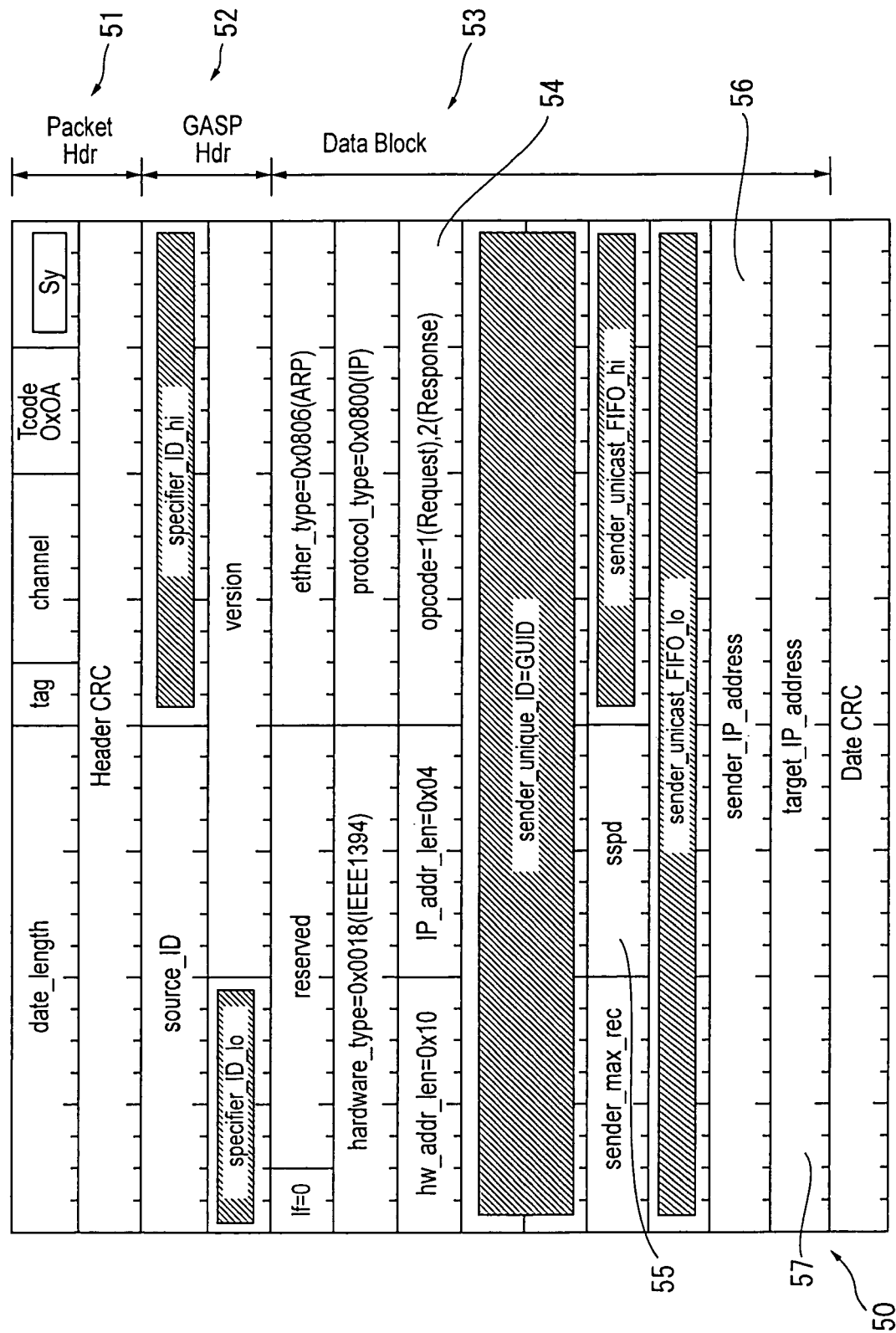
FIG. 7 is a schematic illustration of the configuration of a 1394ARP packet that is used for a processing operation of determining a transmission speed in the first and second embodiments of the present invention.

FIG. 7 is a schematic illustration of the configuration of a 1394ARP packet. FIG. 8 is a schematic block diagram of communication device of this embodiment. FIG. 9 is a schematic block diagram of a controller of communication device of this embodiment.

To begin with, the configuration of a 1394ARP packet 50 that is used for 1394ARP of IP over 1394 in order to determine the transmission speed as source of information on the maximum speed of the target node, the command inquiring the maximum speed information, confirmation information and reception information will be described by referring to FIG. 7.

As shown in FIG. 7, a 1394ARP packet 50 has a packet header section 51, a GASP header section 52 and a data block section 53.

The packet header section 51 is a header part of the packet defined in IEEE1394a-2000 and contains information on the data length and the attributes of the 1394ARP packet 50.

The GASP header section 52 is a global asynchronous stream header part of the packet defined in IEEE1394 and contains information on the sender of the 1394ARP packet 50.

The data block section 53 is a data part of the 1394ARP packet 50 defined in IP over 1394 and has an opcode field 54 describing that the 1394ARP packet 50 is either a request packet or a response packet, an sspd field 55 describing information on the maximum transmission speed at which the communication device 200 can send the 1394ARP packet 50, a sender IP address field 56 describing information on the IP address of the communication device 200, and a target IP address field 57 describing information on the IP address of the target communication device 200 to which the 1394ARP packet 50 is sent. The maximum transmission speed described in the sspd field 55 is either PHY SPEED or LINK SPEED of the communication device 200, whichever lower.

Now, the configuration of the communication device will be described. As shown in FIG. 8, the communication device 200 has an application layer 150 adapted to communications using a protocol of a higher order relative to that of the 1394 Standard and the 1394 Standard, a data generating section 160 adapted to generate communication data in a predetermined data format to be used for transfer to the serial bus as a function of the data it acquires such as audio data and/or video data, a communication section 170 having a transaction layer 110, a link layer 120 and a physical layer 130 and a controller 180 that controls the data generating section 160 and the communication section 170.

The application layer 150 communicates, using a protocol of a higher order relative to that of the 1394 Standard and the 1394 Standard. It also operates other devices in response to a request from a user and notifies the user of the devices connected to the bus.

The data generating section 160 acquires the AV data including the audio data and/or the video data input from the audio reproducing section and/or the video reproducing section (not shown). Then, the data generating section 160 converts the acquired AV data into communication data of a predetermined format, maintaining the real time feature of the data, and output the communication data produced by the conversion to the communication section 170.

As pointed out above, the communication section 170 has three layers including a transaction layer 110, a link layer 120 and a physical layer 130 and a serial bus managing section 140. The transaction layer 110 is adapted to generate the 1394ARP packets 50.

The controller 180 has a CPU and memories (not shown) and comprehensively controls the above described component layers, while exchanging necessary control information via the bus. The information necessary for the comprehensive control operation is temporarily stored in the memory via the bus so as to be used appropriately for the comprehensive control operation. As shown in FIG. 9, the controller 180 has a maximum speed information requesting section 181, a maximum speed information acquisition section 182, a confirmation information transmitting section 183, and a transmission speed selecting section 184.

The maximum speed information requesting section 181 has the transaction layer 110 generate a 1394ARP packet 50 (to be referred to as request packet hereinafter) that contains a command requesting the 1394ARP packet 50 be sent back with information on the maximum transmission speed (information on the maximum speed of the target node) at which the target node, which is a communication device 200 other than itself, can transmit data. Then, the maximum speed information requesting section 181 has the communication section 170 transmit the request packet at the minimum transmission speed of the serial bus via the transaction layer 110. Note that the minimum transmission speed of the serial bus is currently defined as S100 and hence it refers to S100 hereinafter. The communication device 200 that transmits a request packet is referred to as self node hereinafter.

The maximum speed information acquisition section 182 detects if the 1394ARP packet 50 transmitted back from the target node (to be referred to as response packet hereinafter) could be received or not. If reception of the response packet is detected, it recognizes the maximum transmission speed of the target node from the response packet. If reception of the response packet is not detected, it judges that the target node does not exist.

When the response packet is received from the target node, the confirmation information transmitting section 183 compares the maximum transmission speed of the target node as recognized by the maximum speed information acquisition section 182 and the maximum transmission speed of the self node and selects the lower one as upper limit transmission speed for transmitting request packets. It also selects the transmission speed higher than the minimum transmission speed of the serial bus by a step, or S200, as lower limit transmission speed. Then, it has the communication section 170 transmit the request packet to the target node at a transmission speed within the speed range between the selected upper limit transmission speed and the selected lower limit transmission speed for the purpose of confirmation.

The transmission speed selecting section 184 detects reception of the response packet from the target node. Then, it selects the maximum transmission speed at which reception of the response packet could be detected as maximum transmission speed for transmitting data to the target node. The transmission speed selecting section 184 determines if either the maximum transmission speed of the self node or that of the target node and the minimum transmission speed of the serial bus agree with each other or not. If the selecting section 184 determines that they agree with each other, it selects the minimum transmission speed of the serial bus as transmission speed for transmitting data to the target node.

Figure 10:
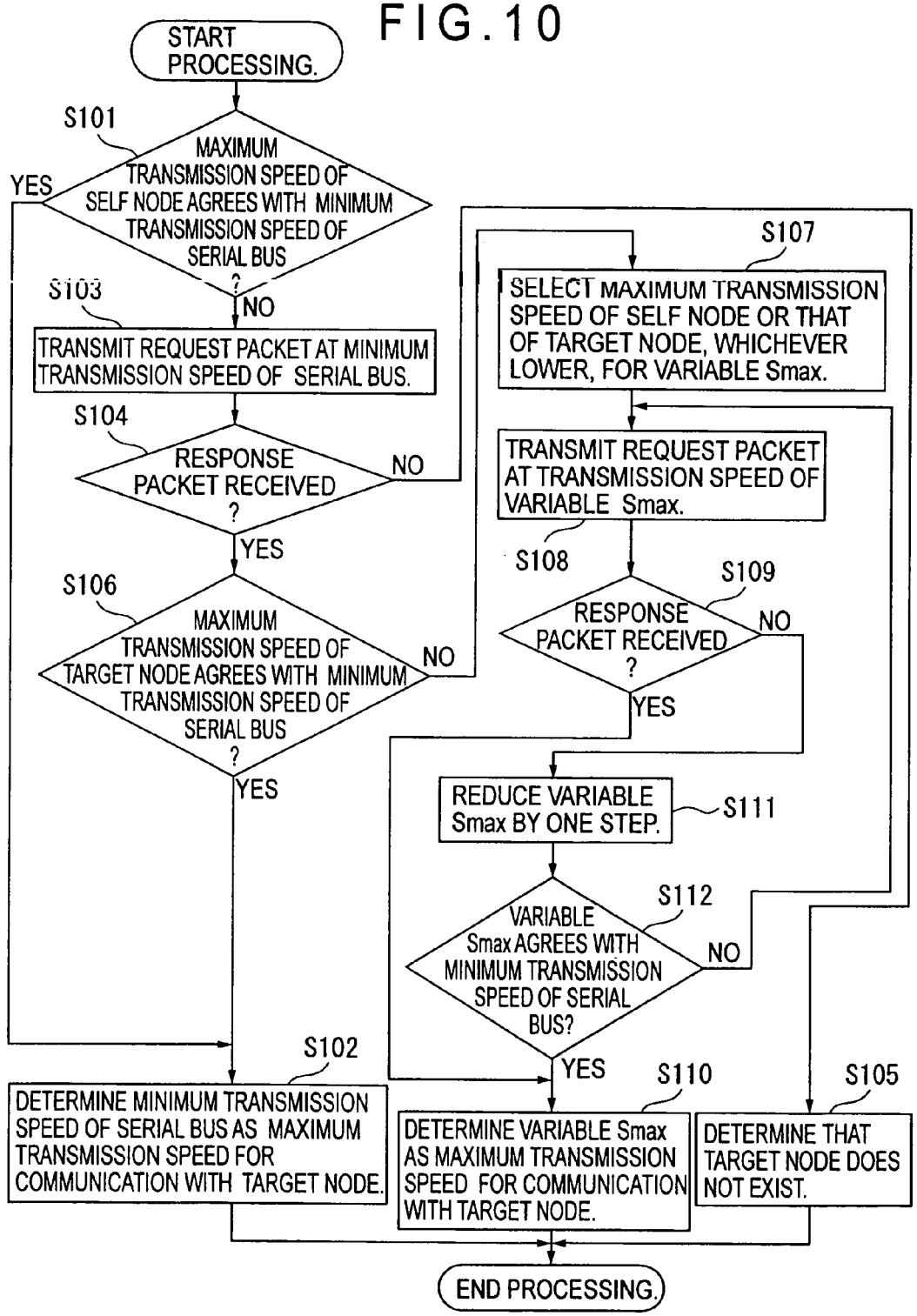
FIG. 10 is a flow chart showing a processing operation of determining a transmission speed of the first embodiment.

The processing operation of the controller 180 for determining the transmission speed to be used to communicate with some other device will be described further in detail by referring to the flow chart of FIG. 10.

Firstly, the self node recognizes PHY SPEED and LINK SPEED of the self node at the transmission speed selecting section 184 of the controller 180. Then, the lower one of recognized PHY SPEED and LINK SPEED is recognized as the maximum transmission speed of the self node. Thereafter, the controller 180 determines if the recognized maximum transmission speed of the self node and the minimum transmission speed of the serial bus agree with each other or not by the transmission speed selecting section 184 (Step S101).

If the controller 180 determines that the maximum transmission speed of the self node and the minimum transmission speed of the serial bus agree with each other and hence the maximum transmission speed of the self node is S100 by means of the transmission speed selecting section 184 in the Step S101, it then determines the minimum transmission speed of the serial bus as the maximum transmission speed at which the self node can exchange information with the target node (Step S102) and terminates the processing operation for determining the transmission speed. This is because the maximum transmission speed of the self node is S100 and hence the self node is not adapted to data communication at a transmission speed higher than S100 regardless of the maximum transmission speed of the target node and that of any other node existing between the self node and the target node. Thus, the controller 180 selects S100 as transmission speed for communicating with the target node without looking into the maximum transmission speed of the target node.

If, on the other hand, the controller 180 determines that the maximum transmission speed of the self node and the minimum transmission speed of the serial bus do not agree with each other and hence the maximum transmission speed of the self node is S200 or S400 by means of the transmission speed selecting section 184 in the Step S101, it then makes the transaction layer 110 generate a request packet (containing a command requesting information on the maximum speed) describing various pieces of information on the self node by the maximum speed information requesting section 181. The request packet has an opcode field 54 describing that the packet transmitted from the self node is a request packet, an sspd field 55 describing information on the maximum transmission speed at which the self node can transmit/receive information, a sender IP address field 56 describing the IP address of the self node and a target IP address field 57 describing the IP address of the target node. Then, the maximum speed information requesting section 181 has the communication section 170 transmit the generated request packet to the target node at the minimum transmission speed of the serial bus, or S100 (Step S103). In this manner, the request packet is transmitted at the minimum transmission speed of the serial bus. Thus, when the target node exists, it is possible to make the target node reliably receive the request packet regardless of the maximum transmission speed of the target node and that of any other node existing between the self node and the target node.

Then, the controller 180 determines if the response packet can be received by the maximum speed information acquisition section 182 or not (Step S104).

In the Step 104, if the controller 180 determines that the response packet cannot be received by the maximum speed information acquisition section 182, then it determines that the target node does not exist because, if the target node exists, the target node sends back the response packet without fail as described above (Step S105) and terminates the processing operation of determining the transmission speed.

In the Step 104, if, on the other hand, the controller 180 determines that the response packet can be received by the maximum speed information acquisition section 182, it recognizes the various pieces of information contained in the received response packet. The response packet has an opcode field 54 describing that the packet received from the target node is a response packet, an sspd field 55 describing information on the maximum transmission speed at which the target node can transmit/receive information and a sender IP address field 56 describing the IP address of the target node. Then, the controller 180 recognizes the maximum transmission speed of the target node by the maximum speed information acquisition section 182 by referring to the sspd field 55. Thereafter, the controller 180 determines if the maximum transmission speed of the target node (maximum speed information of the target node) and the minimum transmission speed of the serial bus (S100) agree with each other or not by the transmission speed selecting section 184 (Step S106).

If the controller 180 determines that the maximum transmission speed of the target node and the minimum transmission speed of the serial bus agree with each other and hence the maximum transmission speed of the target node is S100 by means of the transmission speed selecting section 184 in the Step S106, it is now clear that the self node is not adapted to data communication at a transmission speed higher than S100 regardless of the maximum transmission speed of the target node and that of any other node existing between the self node and the target node. Therefore, the controller 180 determines that it is not necessary to go with the processing operation of determining the transmission speed and proceeds to the Step S102, where it determines that the minimum transmission speed of the serial bus is the maximum transmission speed at which it can exchange information with the target node and terminates the processing operation of determining the transmission speed.

If, on the other hand, the controller 180 determines that the maximum transmission speed of the target node and the minimum transmission speed of the serial bus do not agree with each other and hence the maximum transmission speed of the target node is S200 or S400 by means of the transmission speed selecting section 184 in the Step S106, the controller 180 compares the maximum transmission speed of the self node and the maximum transmission speed of the target node by the confirmation information transmitting section 183. Then, it selects the lower one of the two maximum speeds as transmission speed at which the self node and the target node can transmit/receive data and also selects the lower one for variable Smax (Step S107). For example, the confirmation information transmitting section 183 selects S200 for the variable Smax if the maximum transmission speed of the self node is S200 and the maximum transmission speed of the target node is S400 but selects S400 for the variable Smax if both the maximum transmission speed of the self node and that of the target node are S400.

Then, the controller 180 makes the transaction layer 110 generate a request packet containing various pieces of information on the self node as confirming information by the confirmation information transmitting section 183. Then, it makes the communication section 170 transmit the request packet at the transmission speed of the variable Smax selected in the Step S107, which is S200 or S400 (Step S108).

Thereafter, the controller 180 determines if the response packet can be received or not by the transmission speed selecting section 184 (Step S109).

If the controller 180 determines that the response packet can be received by the transmission speed selecting section 184 in the Step S109, it then determines that it can communicate with the target node at the transmission speed of the variable Smax. Since the variable Smax represents both the maximum transmission speed of the self node and that of the target node for data communication, the controller 180 determines that the selected transmission speed of the variable Smax, which is S200 or S400, is the maximum transmission speed of the target node (Step S110) and terminates the processing operation of determining the transmission speed.

If, on the other hand, the controller 180 determines that the response packet cannot be received by the transmission speed selecting section 184 in the Step S109, it then determines that there is some other device (node) whose transmission speed is smaller than that of the variable Smax in the physical layer between the self node and the target node. Then, the controller 180 selects anew the transmission speed that is lower than the selected the value of the variable Smax by the transmission speed selecting section 184. In other words, it selects S100 if it has selected S200 but it selects S200 if it has selected S400 (Step S111).

Thereafter, the controller 180 determines if the value of the variable Smax selected in the Step S111 and the minimum transmission speed of the serial bus agree with each other or not by the transmission speed selecting section 184 (Step S112).

If the controller 180 determines by the transmission speed selecting section 184 in the Step S112 that the value of the variable Smax and the minimum transmission speed (S100) of the serial bus agree with each other, it then proceeds to the Step S110, where it determines that S100 is the maximum transmission speed between the self node and the target node and terminates the processing operation of determining the transmission speed because it is already confirmed in the Step S103 that data transmission can be realized at S100.

If, on the other hand, the controller 180 determines by the transmission speed selecting section 184 in the Step S112 that the value of the variable Smax and the minimum transmission speed of the serial bus do not agree with each other because, for example, the value of the variable Smax is equal to S200, it then determines that it needs to look into the maximum transmission speed of the target node by using a transmission speed lower than the value of the variable Smax and returns to the Step S108 to repeat the operations of the Step S108 through S112. In other words, the controller 180 reduces the value of the variable Smax stepwise and repeats transmission of a request packet until it receives a response packet from the target node or the value of the variable Smax and the minimum transmission speed of the serial bus agree with each other in order to determine the maximum transmission speed to be used for data transmission between the self node and the target node.

The above-described first embodiment provides the following effects and advantages.

(1) The communication device 200 (i.e. the self node) has the transaction layer 110, by means of the maximum speed information requesting section 181, generate a request packet requesting the other communication device 200 (i.e. the target node) to transmit a response packet containing information on the maximum transmission speed for data communication of the target node, and makes the communication section 170 transmit the request packet to the target node at the minimum transmission speed of the serial bus. Thus, it is possible to have the target node reliably receive the request packet regardless of the maximum transmission speed of the target node and that of any other node existing between the self node and the target node because the minimum transmission speed of the serial bus is selected to transmit the request packet to the target node. Therefore, existence or non-existence of the target node can be confirmed by way of presence of absence of a response packet from the target node and hence it is possible to conduct a communication test between the self node and the target node at the minimum transmission speed.

(2) The self node determines if it can receive the response packet transmitted from the target node or not by the maximum speed information acquisition section 182 and, if it can receive the response packet, it firstly recognizes the maximum transmission speed of the target node by referring to the sspd field 55 of the response packet. Then, it selects the maximum transmission speed of the self node or that of the target node, whichever lower, for the variable Smax by the confirmation information transmitting section 183 and has the communication section 170 transmit a request packet at a transmission speed within a range below the upper limit that is equal to the value of the variable Smax. Thus, it is now possible to eliminate the load of conducting a test transmission between itself and the target node at a transmission speed higher than the maximum transmission speed of the self node and that of the target node by exchanging information for confirmation and on reception for the purpose of confirming the transmission speed to be used for data transmission before actually transmitting data. Thus, it is possible to carry out the processing operation of determining the transmission speed efficiently in a short period of time. For example, if at least either the maximum transmission speed of the self node or that of the target node is equal to S200, a test for transmitting data to the target node at S400 can be omitted. Thus, it is possible to carry out the processing operation of determining the transmission speed efficiently if compared with a case where all the transmission speeds need to be tested.

(3) Additionally, since a 1394ARP packet is actually transmitted and received to select the maximum transmission speed at which data communication can be realized for the transmission speed of the target node when determining the transmission speed, the maximum transmission speed between the self node and the target node can be determined very appropriately. Then, unlike any known comparable method, the self node can determine the maximum transmission speed without performing an operation of topology analysis because the maximum transmission speed is determined based on actual data transmission. Therefore, it is no longer necessary to obtain the transmission speed of the link layer, or LINK SPEED, of each node. Thus, even when there is a communication device on the way that is not adapted to IEEE1394a-2000 and hence does not have a link spd field 21 describing LINK SPEED in the bus information block 20 or when the target node is adapted to IP over 1394 but not to IEEE1394a-2000, the maximum transmission speed can be determined without difficulty to improve the efficiency of the processing operation for determining the transmission speed.

(4) The self node determines, by means of the transmission speed selecting section 184, if the maximum transmission speed of the self node or that of the target node and the minimum transmission speed of the serial bus agree with each other or not and, if they agree with each other, it selects the minimum transmission speed of the serial bus as the maximum transmission speed that can be used for exchanging information with the target node. Thus, the operation of transmitting a request packet can be omitted when the maximum transmission speed of the self node or that of the target node agree with the minimum transmission speed of the serial bus at which data can be transmitted/received to improve the efficiency of the processing operation of determining the transmission speed.

(5) The self node determines that the target node does not exist when it transmits a request packet at the minimum transmission speed of the serial bus and subsequently does not receive any response packet by the maximum speed information requesting section 181. Thus, it is necessary to transmit a request packet to the serial bus only when the target node does not exist to further improve the efficiency of the processing operation of determining the transmission speed.

(6) The self node compares the maximum transmission speed of the self node and that of the target node by the confirmation information transmitting section 183 and selects the lower one for the variable Smax. Then, in a communication test using a 1394ARP packet for determining the transmission speed between the self node and the target node, it starts with the transmission speed of the variable Smax and, if it cannot receive the response packet from the target node, it switches stepwise to a lower transmission speed for the variable Smax until it receives the response packet and determines the value of the variable Smax that is used when it receives the response packet for the first time as the maximum transmission speed. With this arrangement of selecting either the maximum transmission speed of the self node or that of the target node, whichever lower at which both the self node and the target node can transmit data, for the first value of the variable Smax and repeating transmission of the request packet, switching stepwise to a lower transmission speed for the variable Smax, until the response packet from the target node is received, the transmission speed between the two nodes can be selected quickly particularly when the both nodes are adapted to high speed communication typically at S400, and the self node and the target node are directly connected and there is no any other node intervening on the way.

(7) The self node selects anew the one step lower transmission speed for the variable Smax by the transmission speed selecting means 184 and immediately thereafter determines if the selected value of the variable Smax and the minimum transmission speed of the serial bus agree with each other or not so that it determines the value of the variable Smax as the maximum transmission speed when they agree with each other. Thus, the number of times of transmitting a request packet can be reduced by one compared with the case in which such an arrangement is not provided, thereby the efficiency of the processing operation of determining the transmission speed can be further improved.

(8) A 1394ARP packet is utilized for exchanging information on the maximum speed of the target node, the command inquiring the maximum speed value, confirmation and reception between the self node and target node. Thus, the processing operation of determining the transmission speed between the nodes can be conducted with ease by utilizing an existing standard. Additionally, since a 1394ARP packet is used not only as a command for inquiring the maximum speed value but also for acquiring conformation, the overall processing operation can be simplified compared with the case in which a different packet data is used for acquiring confirmation.

2nd Embodiment

Now, the configuration of communication device according to the second embodiment will be described by referring to FIG. 11.

The present embodiment differs from the first embodiment in that the maximum transmission speed between the self node and the target node is determined as the self node transmits a request packet to recognize that the target node actually exists and subsequently transmits the request packet to the target node repeatedly, raising the transmission speed stepwise from the minimum transmission speed of the serial bus. Otherwise, the configuration of the communication device of this embodiment is identical with that of the first embodiment. Therefore, the same components will be denoted respectively by the same reference symbols and will not be described any further. Additionally, Steps S201 through S206, S209 and S210 of the second embodiment are the same as the Steps S101 through 106, S109 and S110 of the first embodiment and hence they will be described only briefly below.

Firstly, the controller 180 of the self node recognizes PHY SPEED or LINK SPEED, whichever lower, as the maximum transmission speed of the self node by the transmission speed selecting section 184. Then, the controller 180 determines if the maximum transmission speed of the self node and the minimum transmission speed of the serial bus agree with each other or not by the transmission speed selecting section 184 (Step S201).

If it is determined in the Step S201, by the transmission speed selecting section 184, that the maximum transmission speed of the self node and the minimum transmission speed of the serial bus agree with each other, the controller 180 determines that the minimum transmission speed of the serial bus is the maximum transmission speed that can be used to exchange information with the target node (Step S202) and terminates the processing operation of determining the transmission speed.

If, on the other hand, it is determined in the Step S201, by the transmission speed selecting section 184, that the maximum transmission speed of the self node and the minimum transmission speed of the serial bus do not agree with each other, the controller 180 has the transaction layer 110 generate a request packet describing various pieces of information of the self node by the maximum speed information requesting section 181, and makes the maximum speed information requesting section 181 transmit the request packet to the target node via the communication section 170 at the minimum transmission speed of the serial bus (Step S203).

Then, the controller 180 determines if the response packet can be received or not by the maximum speed information acquisition section 182 (Step S204).

If it is determined in the Step S204 that the response packet cannot be received by the maximum speed information acquisition section 182, the controller 180 determines that the target node does not exist (Step S205) and terminates the processing operation of determining the transmission speed.

If, on the other hand, it is determined in the Step S204 that the response packet can be received by the maximum speed information acquisition section 182, the controller 180 recognizes the received response packet and determines if the maximum transmission speed of the target node and the minimum transmission speed of the serial bus agree with each other or not by the transmission speed selecting section 184 (Step S206).

If it is determined in the Step S206 that the maximum transmission speed of the target node and the minimum transmission speed of the serial bus agree with each other, the controller 180 proceeds to the Step S202, where it determines the minimum transmission speed of the serial bus as the maximum transmission speed of communication with the target node and terminates the processing operation of determining the transmission speed.

If, on the other hand, it is determined by the transmission speed selecting section 184 in the Step S206 that the maximum transmission speed of the target node and the minimum transmission speed of the serial bus do not agree with each other and hence the transmission speed of the target node is S200 or S400, the controller 180 compares the maximum transmission speed of the self node and that of the target node by the confirmation information transmitting section 183. Then, it selects the maximum transmission speed at which both the self node and the target node can operate for data transmission for the variable Smax and also selects the minimum transmission speed of the serial bus for variable Smin (Step S207).

Then, the controller 108 has the transaction layer 110 generate a request packet describing various pieces of information on the self node by the confirmation information transmitting section 183, and then makes the communication section 170 transmit the request packet to the target node at the transmission speed higher than the value of the variable Smin selected in the Step S207 by one step, or S200 (Step S208).

Thereafter, the controller 180 determines if it can receive the response packet or not by the transmission speed selecting section 184 (Step S209).

If the controller 180 determines by the transmission speed selecting section 184 in the Step S209 that the response packet cannot be received, it is now clear that it is impossible to communicate with the target node at the transmission speed higher than the value of the variable Smin by one step. Therefore, the controller 180 determines, by the transmission speed selecting section 184, the value of the variable Smin selected in the Step S207, or S100, as the maximum transmission speed at which it can communicate with the target node (Step S210) and terminates the processing operation of determining the transmission speed.

If, on the other hand, the controller 180 determines, by the transmission speed selecting section 184 in the Step S209 that the response packet can be received, the transmission speeds of the physical layers of all the devices existing between the self node and the target node are higher than the value of the variable Smin at least by one step. Then, it selects anew the value higher than the value selected in the Step S207 at least by one step for the variable Smin (Step S211). Therefore, if the value selected in the Step S207 is S200, it selects anew S400 for the variable Smin.

Thereafter, the controller 180 determines by the transmission speed selecting section 184 in the Step S211 if the value of the variable Smin selected anew and the value of the variable Smax selected in the Step S207 agree with each other or not (Step S212).

If it is determined by the transmission speed selecting section 184 in the Step S212 that the value of the variable Smin and that of the variable Smax agree with each other, the controller 180 proceeds to the Step S210, where it determines that the value of the variable Smin selected anew in the Step S211 represents the maximum transmission speed for data communication with the target node and terminates the processing operation of determining the transmission speed because it is already confirmed in the Step S209 the self node and the target node can communicate with each other at the transmission speed represented by the variable Smin.

If, on the other hand, it is determined by the transmission speed selecting section 184 in the Step S212 that the value of the variable Smin and that of the variable Smax do not agree with each other, the controller 180 recognizes that the value of the variable Smax that represents the maximum transmission speed at which both the self node and the target node can communicate is greater than the value of the variable Smin and determines that the transmission speed of the target node needs to be looked into by using a transmission speed higher than the value of the variable Smin. Then, it returns to the Step S208 and repeats the operations of the Steps S208 through S212. In other words, it transmits a request packet to the target node repeatedly by increasing the value of the variable Smin stepwise until it can no longer receive the response packet from the target node so as to determine the maximum transmission speed at which the self node can communicate with the target node.

As described above, the second embodiment provides the following effects and advantages in addition to (1) through (5) and (8) of the first embodiment.

(9) The self node compares the maximum transmission speed of the self node and that of the target node by the confirmation information transmitting section 183 and selects the lower one for the variable Smax, while it also selects the minimum transmission speed of the serial bus for the variable Smin. Then, it starts a test, transmitting a 1394ARP packet at the transmission speed higher than the value of the variable Smin by one step, and continues the test, increasing the value of the variable Smin stepwise, until it can no longer receive the response packet from the target node in order to determine the transmission speed between the self node and the target node. Then, it determines the transmission speed lower by one step than the value of the variable Smin that is obtained when it does not receive the response packet for the first time as the maximum transmission speed. In this way, the value selected firstly for the variable Smin is determined as the minimum transmission speed of the serial bus and the self node transmits a request packet repeatedly, increasing the value of the variable Smin stepwise, until it no longer receive the response packet from the target node. With this arrangement, the inter-node maximum transmission speed can be selected quickly particularly when each of the nodes on the way comprises a device only adapted to communications at low speed, at S100 for example, or when both the self node and the target node are only adapted to communications at low speed, at S100 for example, and are directly connected to each other with no other node on the way.

Modifications to the Embodiments

The present invention is by no means limited to the above-described embodiments, which may be modified and/or altered in various different ways without departing from the scope of the invention.

The processing operation of determining if the maximum transmission speed of the self node or that of the target node and the minimum transmission speed of the serial bus agree with each other or not and, if they agree with each other, also determining the minimum transmission speed of the serial bus as the maximum transmission speed at which the self node can communicate with the target node (S101, S201) may be omitted.

In the above described arrangement, after recognizing the maximum transmission speed of the self node, it is determined if the maximum transmission speed of the self node and the minimum transmission speed of the serial bus agree with each other or not (Step S101, S201) and, if it is determined that they agree with each other, the minimum transmission speed of the serial bus is determined to be the maximum transmission speed at which the self node can communicate with the target node to terminate the processing operation of determining the transmission speed (Step S201, S202). But, if it is determined that they do not agree with each other, a request packet is transmitted to the target node at the minimum transmission speed of the serial bus (Step S103, S203) and, after determining that the response packet is received (Step S104, S204), it is determined if the maximum transmission speed of the target node and the minimum transmission speed of the serial bus agree with each other (Step S106, S206). However, it may alternatively be so arranged as will be described below. After recognizing the maximum transmission speed of the self node, a request packet is transmitted to the target node at the minimum transmission speed of the serial bus (Step S103, S203). Then, after determining if the response packet is received or not (Step S104, 204), it is determined if the maximum transmission speed of the self node and the minimum transmission speed of the serial bus agree with each other or not (Step S101, S201) and, if it is determined that they agree with each other, the minimum transmission speed of the serial bus is determined to be the maximum transmission speed at which the self node can communicate with the target node to terminate the processing operation of determining the transmission speed (Step S102, S202). However, if it is determined that they do not agree with each other, it is determined if the maximum transmission speed of the target node and the minimum transmission speed of the serial bus agree with each other or not (Step S106, S206).

With this arrangement, after determining if the response packet is received or not (Step S104, S204), it is determined if the maximum transmission speed of the self node and the minimum transmission speed of the serial bus agree with each other or not (Step S101, S201) and, if it is determined that they agree with each other, the minimum transmission speed of the serial bus is determined to be the maximum transmission speed at which the self node can communicate with the target node to terminate the processing operation of determining the transmission speed (Step S102, S202), thereby it is possible to reliably determine if the target node exists or not so as to terminate the processing operation of determining the transmission speed.

While an arrangement of using the maximum transmission speed at which the self node and the target node can operate for data communication as upper limit and transmitting a request packet by reducing the transmission speed stepwise from the upper limit transmission speed and an arrangement of using the transmission speed higher than the minimum transmission speed of the serial bus by one step as lower limit and transmitting a request packet by raising the transmission speed stepwise from the lower limit transmission speed are described above, the present invention is by no means limited thereto. For example, a request packet may be transmitted at a transmission speed arbitrarily selected within the range between the upper limit and the lower limit and then transmitted repeatedly by raising or reducing the transmission speed stepwise. Particularly, when the selectable transmission speeds are not limited to the three speeds of S100, S200 and S400 and steps of S800 (800 Mbps), S1600 (1.6 Gbps) and S3200 (3.2 Gbps) are added as usable transmission speeds, while the maximum transmission speed of the self node or that of the target node, whichever lower, is used as upper limit and the transmission speed that is higher than the selectable minimum transmission speed by one step is used as lower limit, then a request packet may be transmitted for a test at an intermediary speed between the upper limit and the lower limit and, if the target node can receive it, another request packet may be transmitted at an intermediary speed between the above speed and the upper limit so that, if the target node cannot receive, another request packet may be transmitted at an intermediary speed between the above speed and the lower limit. In short, it is only necessary to switch the transmission speed between the upper limit and the, lower limit. In other words, it is not necessary to switch repeatedly from the upper limit toward the lower limit or vice versa.

While the transmission speed for sending a request packet is downwardly or upwardly switched stepwise in the above arrangement, the present invention is not limited thereto and the transmission speed may alternatively be raised or reduced by a multiple of steps such as two steps or three steps.

While a 1394ARP packet is used for the purpose of exchange information on the maximum speed of the target node, the command inquiring the maximum speed value, confirmation and reception in the above description, the present invention is not limited thereto and information may be transmitted/received by some other technique. For example, it is sufficient for the command inquiring the maximum speed value that it requests the target node to transmit information on its maximum transmission speed. It is not necessary that the information on the maximum transmission speed of the target node be contained in a 1394ARP packet when it is sent back to the self node, and a scheme by which only the information is transmitted back may alternatively be devised. Additionally, since the information on confirmation and reception is used only to determine if data can be transmitted and received, it is not necessary to use a 1394ARP packet. For example, information of any form that can be exchanged between the self node and the target node for read transactions, write transactions, lock transactions of asynchronous transactions other than broadcast transactions may be used.

While the controller 180 of the communication device 200 is used for the processing operation of issuing 1394ARP packets and determining the transmission speed in the above description, the present invention is not limited thereto and an external terminal device (computer) connected to a communication device 200 that does not have a controller 180 may be used to store the program necessary for the processing operation of determining the transmission speed and execute the program so as to control the communication device 200 via the application layer 150 and perform the processing operation of determining the transmission speed at which the communication device transmits information to and receive information from other communication devices.

The specific procedures by which the present invention is embodied may be modified and/or altered appropriately without departing from the scope of the present invention.

What is claimed is:

1. A communication device adapted to select one of a plurality of stepwise differentiated transmission speeds as the transmission speed to be used for data communication between itself and another communication device through at least one intervening a processor communication device, the device comprising:
   a maximum speed information requesting section adapted to transmit a maximum speed information requesting command only to said another communication device at the minimum one of the transmission speeds, requesting transmission in return of maximum speed information for target node, which is the maximum data communication speed information of said another communication device;
   a maximum speed information acquisition section adapted to acquire maximum speed information for target node from said another communication device;
   a confirmation information transmitting section adapted to transmit confirmation information for confirming the capability of transmission for data communication with said another communication device, switching the transmission speed for transmitting the confirmation information within a range between an upper limit equal to speed of the maximum speed information of the self node, which is the maximum speed for the communication device to transmit data to another communication device, or that of the target node, whichever lower, and a lower limit equal to the transmission speed higher than the minimum transmission speed by a step; and
   a transmission speed selecting section adapted to detect the reception information transmitted back from said another communication device in response to the reception of the confirmation information, and select the maximum transmission speed for the detected reception information as transmission speed for transmitting data to said another communication device for data communication.

2. A device according to claim 1, wherein
the transmission speed selecting section determines the minimum speed of said plurality of stepwise differentiated transmission speeds as the transmission speed for data communication with said another communication device, when at least either the maximum transmission speed of the self node or that of the target node is equal to the minimum speed of the plurality of stepwise differentiated transmission speeds.

3. A device according to claim 1, wherein
the maximum speed information acquisition section determines that said another communication device does not exist when it cannot receive information on the maximum transmission speed of the target node transmitted back from said another communication device.

4. A device according to claim 1, wherein
the confirmation information transmitting section transmits the confirmation information at the speed of the maximum speed information of the self node or that of the target node, whichever lower, and, when the transmission speed selecting section cannot detect the reception information transmitted back from said another communication device, it repeatedly transmits the confirmation information, stepwise reducing the transmission speed, until the transmission speed selecting section can detect the reception information.

5. A device according to claim 1, wherein
the confirmation information transmitting section transmits the confirmation information at the transmission speed higher than the minimum transmission speed by one step and, when the transmission speed selecting section can detect the reception information transmitted back from said another communication device, it repeatedly transmits the confirmation information, stepwise raising the transmission speed, until the transmission speed selecting section can no longer detect the reception information.

6. A device according to claim 1, wherein
data communication with said another communication device based on IEEE (Institute of Electrical and Electronic Engineers) 1394 Standard and a 1394ARP (Address Resolution Protocol) packet is used for the maximum speed information of the target node and the maximum speed information requesting command.

7. A communication system comprising:
   a communication device including a processor adapted to select one of a plurality of stepwise differentiated transmission speeds as the transmission speed to be used for data communication between itself and another communication device through at least one intervening communication device, the device further comprising:
   a maximum speed information requesting section adapted to transmit a maximum speed information requesting command only to said another communication device at the minimum one of the transmission speeds, requesting transmission in return of maximum speed information for target node, which is the maximum data communication speed information of said another communication device;
   a maximum speed information acquisition section adapted to acquire maximum speed information for target node from said another communication device;
   a confirmation information transmitting section adapted to transmit confirmation information for confirming the capability of transmission for data communication with said another communication device, switching the transmission speed for transmitting the confirmation information within a range between the upper limit equal to speed of the maximum speed information of the self node, which is the maximum speed for the communication device to transmit data to another communication device, or that of the target node, whichever lower, and the lower limit equal to the transmission speed higher than the minimum transmission speed by a step; and
   a transmission speed selecting section adapted to detect the reception information transmitted back from said another communication device in response to the reception of the confirmation information and select the maximum transmission speed for the detected reception information as transmission speed for transmitting data to said another communication device for data communication; and
   at least one of said another communication device connected to the communication device via a telecommunication line so as to be capable of data communication, said another communication device being adapted to transmit back the maximum speed information of the target node in response to the reception of the maximum speed information requesting command and also transmit back the reception information in response to the reception of the confirmation information.

8. A communication method of selecting one of a plurality of stepwise differentiated transmission speeds as the transmission speed to be used for data communication between a communication device and another communication device through at least one intervening communication device, the method comprising:

transmitting a maximum speed information requesting command only to said another communication device at the minimum one of the transmission speeds, requesting transmission in return of maximum speed information of target node, which is the maximum data communication speed information of said another communication device;

acquiring maximum speed information of target node from said another communication device;

transmitting confirmation information for confirming the readiness for data communication with said another communication device, switching the transmission speed for transmitting the confirmation information within a range between the upper limit equal to speed of the maximum speed of the self node, which is the maximum speed for the communication device to transmit data to another communication device, or that of the target node, whichever lower, and the lower limit equal to the transmission speed higher than the minimum transmission speed by a step; and detecting the reception information transmitted back from said another communication device in response to the reception of the confirmation information and selecting the maximum transmission speed of the detected reception information as transmission speed for transmitting data to said another communication device for data communication.

9. A communication program, stored in a recording medium in a computer-readable manner, adapted to make a communication method of selecting one of a plurality of stepwise differentiated transmission speeds as the transmission speed to be used for data communication between a communication device and another communication device, through at least one intervening communication devices to be executed by a computing section, the method comprising:

transmitting a maximum speed information requesting command only to said another communication device at the minimum one of the transmission speeds, requesting transmission in return of maximum speed information of target node, which is the maximum data communication speed information of said another communication device;

acquiring maximum speed information of target node from said another communication device;

transmitting confirmation information for confirming the readiness for data communication with said another communication device, switching the transmission speed for transmitting the confirmation information within a range between the upper limit equal to speed of the maximum speed of the self node, which is the maximum speed for the communication device to transmit data to another communication device, or that of the target node, whichever lower, and the lower limit equal to the transmission speed higher than the minimum transmission speed by a step; and detecting the reception information transmitted back from said another communication device in response to the reception of the confirmation information and selecting the maximum transmission speed of the detected reception information as transmission speed for transmitting data to said another communication device for data communication.

10. A computer readable medium non-transitory encoded with instructions capable of being executed by a computer, the computer readable medium storing thereon a communication program being adapted to make a communication method of selecting one of a plurality of stepwise differentiated transmission speeds as the transmission speed to be used for data communication between a communication device and another communication device, through at least one intervening communication device, to be executed by a computing section, the method comprising:

transmitting a maximum speed information requesting command only to said another communication device at the minimum one of the transmission speeds, requesting transmission in return of maximum speed information of target node, which is the maximum data communication speed information of said another communication device;

acquiring maximum speed information of target node from said another communication device;

transmitting confirmation information for confirming the readiness for data communication with said another communication device, switching the transmission speed for transmitting the confirmation information within a range between the upper limit equal to speed of the maximum speed of the self node, which is the maximum speed for the communication device to transmit data to another communication device, or that of the target node, whichever lower, and the lower limit equal to the transmission speed higher than the minimum transmission speed by a step; and detecting the reception information transmitted back from said another communication device in response to the reception of the confirmation information and selecting the maximum transmission speed of the detected reception information as transmission speed for transmitting data to said another communication device for data communication.

* * * * *